US012737808B2

(12) United States Patent
Tieng et al.

(10) Patent No.: US 12,737,808 B2
(45) Date of Patent: Sep. 15, 2026

(54) COMPREHENSIVE ENERGY-SAVING AND CARBON-NEGATIVE SYSTEM AND METHOD THEREOF, AND NON-TRANSITORY COMPUTER READABLE RECORDING MEDIUM

(71) Applicant: NATIONAL CHENG KUNG UNIVERSITY, Tainan City (TW)

(72) Inventors: Hao Tieng, Tainan City (TW); Chun-Yen Chen, Tainan City (TW); Yu-Yong Li, Tainan City (TW); Yu-Chuan Lin, Yunlin County (TW); Fan-Tien Cheng, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 0 days.

(21) Appl. No.: 18/953,074

(22) Filed: Nov. 20, 2024

(65) Prior Publication Data

US 2026/0050974 A1 Feb. 19, 2026

(30) Foreign Application Priority Data

Aug. 19, 2024 (TW) ................................ 113131140

(51) Int. Cl.
*G06Q 40/04* (2012.01)
*G06Q 10/30* (2023.01)

(52) U.S. Cl.
CPC ............ *G06Q 40/04* (2013.01); *G06Q 10/30* (2013.01)

(58) Field of Classification Search
CPC .............................. G06Q 40/04; G06Q 10/30
See application file for complete search history.

(56) References Cited

U.S. PATENT DOCUMENTS

| | | | |
|---|---|---|---|
| 10,618,137 B2 | 4/2020 | Chen et al. | |
| 2020/0130510 A1 | 4/2020 | Eck et al. | |
| 2024/0070776 A1* | 2/2024 | Novek | G06Q 30/0206 |
| 2024/0095755 A1 | 3/2024 | Tieng et al. | |

FOREIGN PATENT DOCUMENTS

| | | |
|---|---|---|
| CN | 117217806 A | 12/2023 |
| CN | 118485267 A | 8/2024 |

* cited by examiner

*Primary Examiner* — Scott S Trotter
(74) *Attorney, Agent, or Firm* — CKC & Partners Co., LLC

(57) ABSTRACT

A Comprehensive Energy-Saving and Carbon-Negative system (CESCN) includes a Carbon-negative Emissions Device (CED) based on Carbon Capture, Utilization and Storage (CCUS). CED can obtain a carbon emission reduction target from a current Industry 4.2-Green intelligent Manufacturing (14.2-GiM) system, and then collect the material consumption and equipment operation energy consumption data of the CCUS process of CED through a Cyber Physical Agent (CPA) which is the Internet of Things (IoT) component. An intelligent method is used to identify the execution progress of CCUS and improve the automation and intelligent operation of CCUS. The CESCN can effectively reduce the manpower requirements of implementing CCUS and the overall energy consumption of the production line. In addition, it can calculate the amount of the carbon reduction, the amount of the carbon offset and amount of feasible carbon trading according to the amount of carbon fixation.

18 Claims, 4 Drawing Sheets

COMPREHENSIVE ENERGY-SAVING AND CARBON-NEGATIVE SYSTEM AND METHOD THEREOF, AND NON-TRANSITORY COMPUTER READABLE RECORDING MEDIUM

RELATED APPLICATIONS

This application claims priority to Taiwan Application Serial Number 113131140, filed Aug. 19, 2024, which is herein incorporated by reference.

BACKGROUND

Technical Field

The present disclosure relates to an energy-saving and carbon-negative system and a method thereof, and a non-transitory computer readable recording medium. More particularly, the present disclosure relates to a comprehensive energy-saving and carbon-negative system and a method thereof, and a non-transitory computer readable recording medium.

Description of Related Art

The implementation processes of a conventional Carbon Capture, Utilization and Storage (CCUS) method, such as status judgment, degree of carbon capture, ranges of equipment operating parameters or operation start and stop, are all related to the current status of implementing CCUS. Depending on the current status of implementing CCUS, the equipment operating parameters are set through expert experience and manual effort.

The conventional CCUS method mainly has some key problems. First, the standards for manually judging the CCUS progress stages are inconsistent. The CCUS progress stages are mainly judged from the appearance according to the past experience of the operator. When the number of production lines is huge, judgment experience of different operators may cause differences in the CCUS progress stages of the same batch. Second, setting standards of key equipment operating parameters are inconsistent. Inconsistent judgment of the CCUS progress stages will affect the parameter setting of the production equipment operation to generate inconsistent setting standards. The ranges of equipment operating parameters and operation start and stop are all related to the key equipment operating parameters. Third, carbon capture, carbon storage, carbon-fixation and carbon-reduction benefits of the conventional CCUS method are difficult to quantify, and difficult to be systematically incorporated into the carbon trading market.

It can be seen that it is not easy to grasp the equipment production capacity, quality and carbon-fixation benefit of CCUS, and an automatic and intelligent platform is urgently needed. Therefore, a comprehensive energy-saving and carbon-negative system and a method thereof, and a non-transitory computer readable recording medium which have a consistent standard of judgment, a consistent setting standard of the equipment operating parameters and specifically quantified carbon-fixation and carbon-reduction benefits are commercially desirable.

SUMMARY

An object of the present disclosure is to provide a comprehensive energy-saving and carbon-negative system and a method thereof, and a non-transitory computer readable recording medium. A carbon-negative emissions device (CED) of the comprehensive energy-saving and carbon-negative system can construct a digital transformation environment required for CCUS in the CCUS environment, such as various sensors. Two intelligent modules are imported and include an intelligent CCUS planning module and an intelligent carbon trading planning module. The two intelligent modules may provide effective decision-making suggestions according to collected data and changes in the surrounding environment, thereby solving the problems that conventional technology has an inconsistent standard of judgment, an inconsistent setting standard of the equipment operating parameters, and the difficulty of specifically quantifying carbon-fixation and carbon-reduction benefits and being unable to be incorporated into the carbon trading market.

According to one aspect of the present disclosure, a comprehensive energy-saving and carbon-negative system includes a carbon-negative device and a processing device. The carbon-negative device is configured to perform carbon-fixation according to a carbon-negative device parameter. The processing device is signally connected to the carbon-negative device, and includes a memory and a processor. The memory stores a plurality of data sources. The plurality of data sources include energy consumption information, and the energy consumption information comes from the carbon-negative device. The processor is signally connected to the memory and configured to perform operations including performing an intelligent carbon-capture utilization storage planning operation, a process end confirming operation and an intelligent carbon trading planning operation. The intelligent carbon-capture utilization storage planning operation includes defining a carbon emission reduction demand target value according to a carbon emission reduction demand of a green intelligent manufacturing (GiM) system, and calculating an expected production output and an estimated completion time, and performing a carbon-capture utilization storage process. The carbon-capture utilization storage process includes carbon capturing, utilizing and storing of carbon dioxide. The process end confirming operation includes confirming whether the carbon-capture utilization storage process is completed according to the carbon emission reduction demand target value. The intelligent carbon trading planning operation includes calculating an actual carbon emission reduction amount according to an amount of the carbon dioxide absorbed in the carbon-capture utilization storage process to perform voluntary carbon emission reduction of the GiM system, and confirming whether the carbon emission reduction demand of the GiM system is met.

In some embodiments, the processor is configured to perform the operations further including in response to determining that the carbon-capture utilization storage process is not completed, repeatedly performing the intelligent carbon-capture utilization storage planning operation; and in response to determining that the carbon-capture utilization storage process is completed, performing the intelligent carbon trading planning operation.

In some embodiments, the comprehensive energy-saving and carbon-negative system further includes a plurality of cyber physical agents (CPAs). The plurality of cyber physical agents are connected between the processing device and the carbon-negative device, and configured to collect the plurality of data sources. The plurality of data sources further include GiM information, and the GiM information comes from a factory.

In some embodiments, the intelligent carbon-capture utilization storage planning operation further includes performing a carbon-negative device parameter controlling operation. The carbon-negative device parameter controlling operation includes utilizing an optimization algorithm to adjust the carbon-negative device parameter, and the carbon-negative device parameter is calculated as follows:

$$\min GC = w_{GC} GC^{ele} + (1 - w_{GC}) GC^{ce};$$

where min GC represents a minimum growth control cost; $w_{GC}$ represents a growth control weight; $GC^{ele}$ represents a device electricity cost; and $GC^{ce}$ represents a device carbon emission cost.

In some embodiments, the optimization algorithm is a genetic algorithm.

In some embodiments, the intelligent carbon trading planning operation further includes confirming whether a carbon offset demand of the GiM system is met to generate a confirmation result. In response to determining that the confirmation result is yes, performing a transaction profit and loss analysis. In response to determining that the confirmation result is no, performing the voluntary carbon emission reduction of the GiM system.

According to another aspect of the present disclosure, a comprehensive energy-saving and carbon-negative method includes performing a receiving step, an intelligent carbon-capture utilization storage planning step, a process end confirming step and an intelligent carbon trading planning step. The receiving step includes configuring a processor of a processing device to receive a plurality of data sources from a memory. The plurality of data sources include energy consumption information. The energy consumption information comes from a carbon-negative device, and the carbon-negative device is configured to perform carbon-fixation according to a carbon-negative device parameter. The intelligent carbon-capture utilization storage planning step includes configuring the processor to define a carbon emission reduction demand target value according to a carbon emission reduction demand of a green intelligent manufacturing (GiM) system, and calculate an expected production output and an estimated completion time, and perform a carbon-capture utilization storage process. The carbon-capture utilization storage process includes carbon capturing, utilizing and storing of carbon dioxide. The process end confirming step includes configuring the processor to confirm whether the carbon-capture utilization storage process is completed according to the carbon emission reduction demand target value. The intelligent carbon trading planning step includes configuring the processor to calculate an actual carbon emission reduction amount according to an amount of the carbon dioxide absorbed in the carbon-capture utilization storage process to perform voluntary carbon emission reduction of the GiM system, and confirm whether the carbon emission reduction demand of the GiM system is met.

In some embodiments, the comprehensive energy-saving and carbon-negative method further includes in response to determining that the carbon-capture utilization storage process is not completed, configuring the processor to repeatedly perform the intelligent carbon-capture utilization storage planning step; and in response to determining that the carbon-capture utilization storage process is completed, configuring the processor to perform the intelligent carbon trading planning step.

In some embodiments, the comprehensive energy-saving and carbon-negative method further includes configuring a plurality of cyber physical agents (CPAs) to collect the plurality of data sources. The plurality of cyber physical agents are connected between the processing device and the carbon-negative device. The plurality of data sources further include GiM information, and the GiM information comes from a factory.

In some embodiments, the intelligent carbon-capture utilization storage planning step further includes configuring the processor to perform a carbon-negative device parameter controlling step. The carbon-negative device parameter controlling step includes utilizing an optimization algorithm to adjust the carbon-negative device parameter, and the carbon-negative device parameter is calculated as follows:

$$\min GC = w_{GC} GC^{ele} + (1 - w_{GC}) GC^{ce};$$

where min GC represents a minimum growth control cost; $w_{GC}$ represents a growth control weight; $GC^{ele}$ represents a device electricity cost; and $GC^{ce}$ represents a device carbon emission cost.

In some embodiments, the optimization algorithm is a genetic algorithm.

In some embodiments, the intelligent carbon trading planning step further includes configuring the processor to confirm whether a carbon offset demand of the GiM system is met to generate a confirmation result. In response to determining that the confirmation result is yes, performing a transaction profit and loss analysis. In response to determining that the confirmation result is no, performing the voluntary carbon emission reduction of the GiM system.

According to further another aspect of the present disclosure, a non-transitory computer readable recording medium storing instructions which when executed by a processor of a processing device is configured to perform a comprehensive energy-saving and carbon-negative method. The comprehensive energy-saving and carbon-negative method includes performing a receiving step, an intelligent carbon-capture utilization storage planning step, a process end confirming step and an intelligent carbon trading planning step. The receiving step includes configuring the processor to receive a plurality of data sources from a memory. The plurality of data sources include energy consumption information. The energy consumption information comes from a carbon-negative device, and the carbon-negative device is configured to perform carbon-fixation according to a carbon-negative device parameter. The intelligent carbon-capture utilization storage planning step includes configuring the processor to define a carbon emission reduction demand target value according to a carbon emission reduction demand of a green intelligent manufacturing (GiM) system, and calculate an expected production output and an estimated completion time, and perform a carbon-capture utilization storage process, and the carbon-capture utilization storage process includes carbon capturing, utilizing and storing of carbon dioxide. The process end confirming step includes configuring the processor to confirm whether the carbon-capture utilization storage process is completed according to the carbon emission reduction demand target value. The intelligent carbon trading planning step includes configuring the processor to calculate an actual carbon emission reduction amount according to an amount of the carbon dioxide absorbed in the carbon-capture utilization storage process to perform voluntary carbon emission reduction of the GiM system, and confirm whether the carbon emission reduction demand of the GiM system is met.

In some embodiments, the comprehensive energy-saving and carbon-negative method further includes in response to determining that the carbon-capture utilization storage process is not completed, configuring the processor to repeatedly perform the intelligent carbon-capture utilization storage planning step; and in response to determining that the carbon-capture utilization storage process is completed, configuring the processor to perform the intelligent carbon trading planning step.

In some embodiments, the comprehensive energy-saving and carbon-negative method further includes configuring a plurality of cyber physical agents (CPAs) to collect the plurality of data sources. The plurality of cyber physical agents are connected between the processing device and the carbon-negative device. The plurality of data sources further include GiM information, and the GiM information comes from a factory.

In some embodiments, the intelligent carbon-capture utilization storage planning step further includes configuring the processor to perform a carbon-negative device parameter controlling step. The carbon-negative device parameter controlling step includes utilizing an optimization algorithm to adjust the carbon-negative device parameter, and the carbon-negative device parameter is calculated as follows:

$$\min GC = w_{GC} GC^{ele} + (1 - w_{GC})\, GC^{ce};$$

where min GC represents a minimum growth control cost; $w_{GC}$ represents a growth control weight; $GC^{ele}$ represents a device electricity cost; and $GC^{ce}$ represents a device carbon emission cost.

In some embodiments, the optimization algorithm is a genetic algorithm.

In some embodiments, the intelligent carbon trading planning step further includes configuring the processor to confirm whether a carbon offset demand of the GiM system is met to generate a confirmation result. In response to determining that the confirmation result is yes, performing a transaction profit and loss analysis; in response to determining that the confirmation result is no, performing the voluntary carbon emission reduction of the GiM system.

Therefore, the comprehensive energy-saving and carbon-negative system and the method thereof, and the non-transitory computer readable recording medium of the present disclosure can determine the implementation status of the CED and provide implementation plan of CCUS to maximize CCUS benefits and achieve carbon neutrality or even carbon-negative condition, thereby avoiding differences caused by personal experience and reducing human operating errors and manpower requirements simultaneously. Moreover, the present disclosure can perform optimal control of CED parameter to automatically and dynamically change the operating parameters of each equipment and standardize the entire CCUS process of the CED, thereby simultaneously achieving the purpose of energy-saving and carbon-negative control on the premise of meeting the basic operating environment of CCUS and maximized CCUS benefits. In addition, in order to quantify the results of CCUS, the present disclosure can calculate the carbon-fixation benefits which are brought about by absorbing the large amount of carbon dioxide during implementation of CCUS, and collect information on international carbon prices and the carbon trading market to facilitate analysis of the economic benefits brought about by the implementation of CCUS.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

In order to achieve the goal of net zero carbon emission in 2050, the Carbon Capture, Utilization and Storage (CCUS) method is used as a key technology to reduce carbon emissions. The present disclosure provides a Comprehensive Energy-Saving and Carbon-Negative system (CESCN). The CESCN includes a Carbon-negative Emissions Device (CED) based on CCUS. The CED can obtain a carbon emission reduction target from a current Industry 4.2-Green intelligent Manufacturing (14.2-GiM) system, and then collect the material consumption and equipment operation energy consumption data of the CCUS process of CED through CPA which is the Internet of Things (IoT) component. The present disclosure uses an intelligent method to identify the execution progress of CCUS and improve the automation and intelligent operation of CCUS. Therefore, the CESCN of the present disclosure can effectively reduce the manpower requirements of implementing CCUS and the overall energy consumption of the production line. In addition, the present disclosure can calculate the amount of the carbon reduction, the amount of the carbon offset and the amount of feasible carbon trading according to the amount of carbon fixation.

Figure 1:
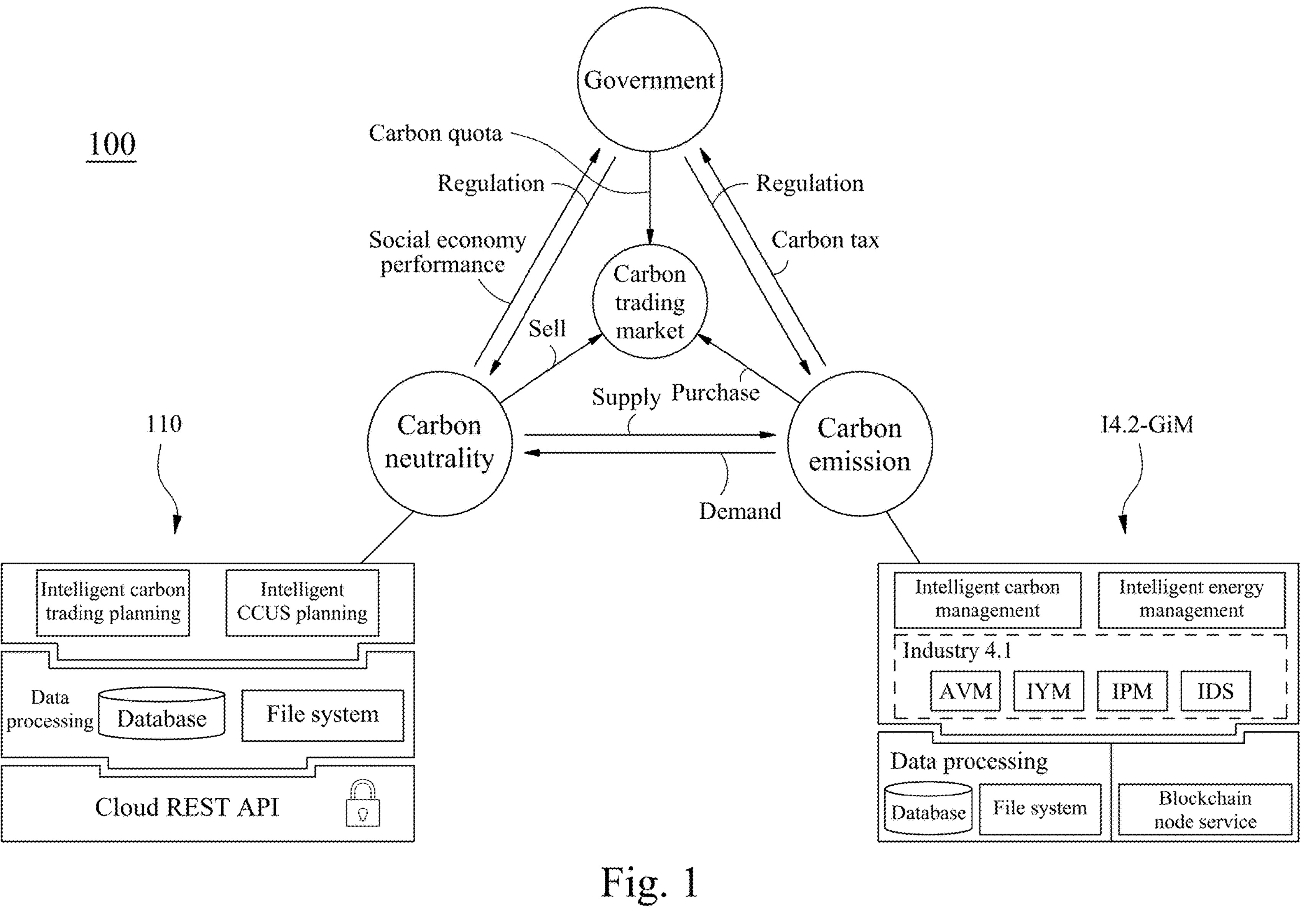
FIG. 1 shows a schematic view of a comprehensive energy-saving and carbon-negative system according to a first embodiment of the present disclosure.
Figure 2:
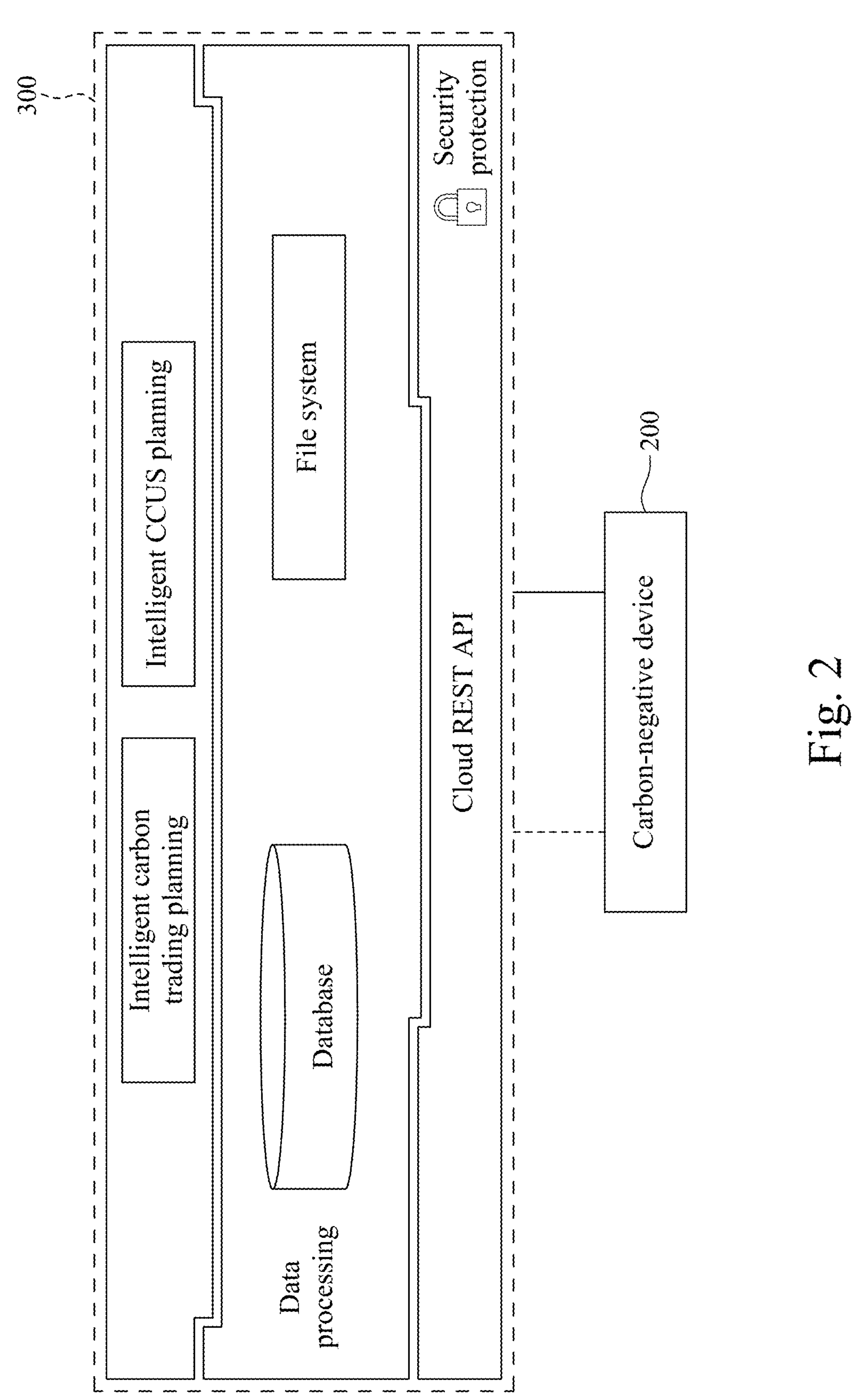
FIG. 2 shows a schematic view of a carbon-negative emissions device of the comprehensive energy-saving and carbon-negative system of FIG. 1.
Figure 3:
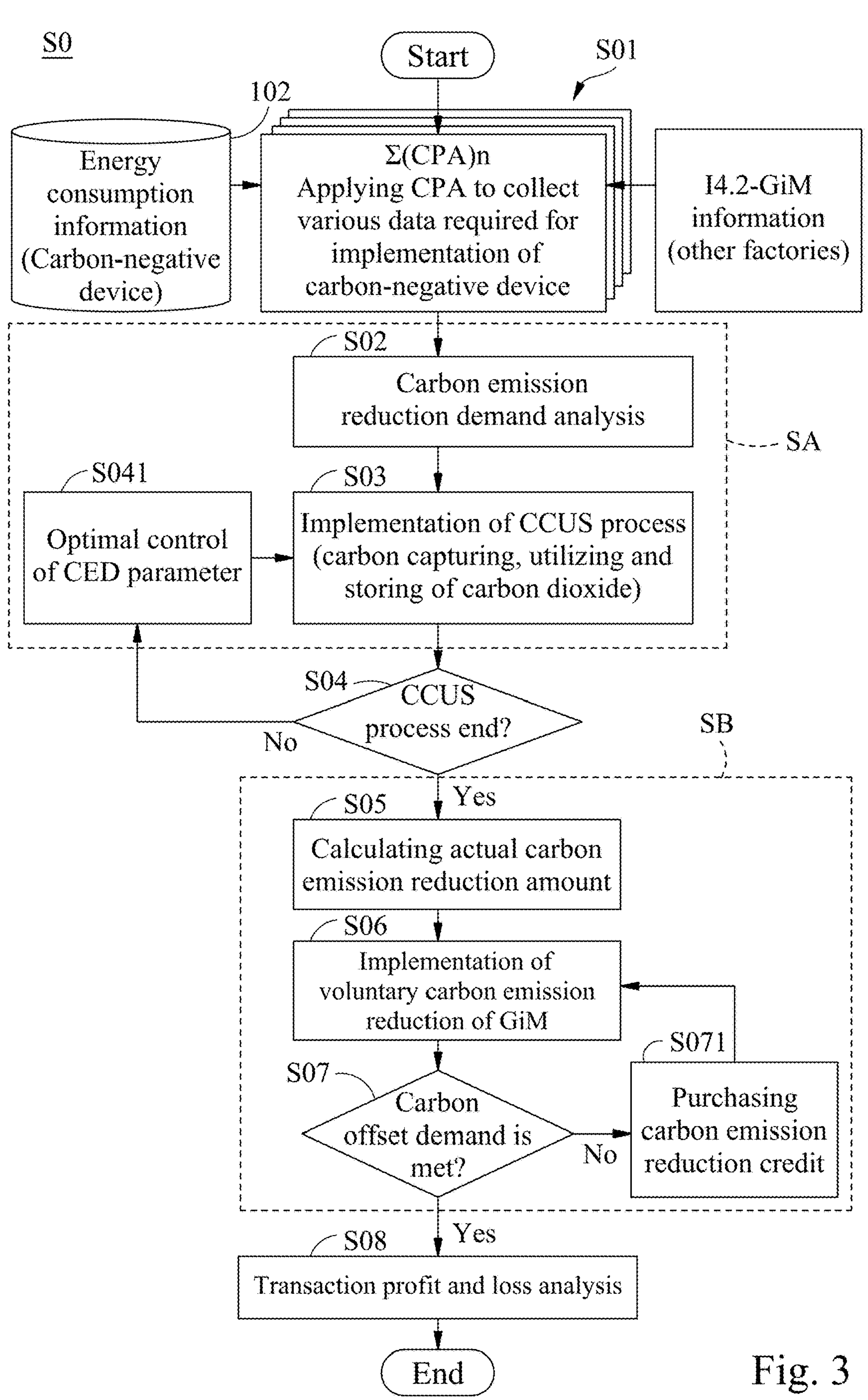
FIG. 3 shows a flow chart of a comprehensive energy-saving and carbon-negative method according to a second embodiment of the present disclosure.

Reference is made to FIGS. 1, 2 and 3. FIG. 1 shows a schematic view of a comprehensive energy-saving and carbon-negative system 100 according to a first embodiment of the present disclosure. FIG. 2 shows a schematic view of a carbon-negative emissions device 110 of the comprehensive energy-saving and carbon-negative system 100 of FIG. 1. FIG. 3 shows a flow chart of a comprehensive energy-saving and carbon-negative method S0 according to a second embodiment of the present disclosure. The comprehensive energy-saving and carbon-negative method S0 can be applied to the carbon-negative emissions device 110 of the comprehensive energy-saving and carbon-negative system 100, but the present disclosure is not limited thereto. FIG. 1 also shows a schematic view of a relationship among the carbon-negative emissions device 110 of the comprehensive energy-saving and carbon-negative system 100, the Industry 4.2-green intelligent manufacturing (14.2-GiM) system, the government and the carbon trading market.

As seen from FIG. 1, in the carbon trading market, the government issues total carbon emissions quota to the carbon trading market in accordance with the law (regulation), and the enterprise (corresponding to carbon emission) is awarded emission quota (carbon quota) by the government according to its social and economic image and performance (social economy performance). The factory needs to pay corresponding carbon tax to the government according to its actual carbon emission during operation, or purchase carbon credit in the carbon trading market to perform carbon offset.

The enterprise and factory can move from the situation of energy-saving and carbon-reduction to the situation of carbon-offset and carbon-negative through the 14.2-GiM system (14.2-GiM platform) and the carbon-negative emissions device 110. First, in the 14.2-GiM system, the production scheduling, facility control and electricity allocation based on energy-saving and carbon-reduction are performed by the factory to reduce direct and indirect carbon emissions as much as possible. For the remaining carbon emission, the 14.2-GiM system can provide "carbon emission elimination" demand to the carbon-negative emissions device 110, which is the carbon emission reduction demand ("demand" in FIG. 1). Next, the carbon-negative emissions device 110 performs carbon capturing, utilizing and storing of carbon dioxide (the CCUS process), such as microalgae cultivation, afforestation or chemical engineering which provides substantial carbon neutrality by direct carbon-fixation, that is the carbon emission reduction supply ("supply" in FIG. 1). The benefit of carbon-fixation can be directly quantified into substantial carbon credit. After the benefit evaluation of the carbon-negative emissions device 110, the carbon credit can be directly used to perform carbon offset by the enterprise. If the carbon credit is insufficient, the enterprise can purchase carbon emission reduction credit to perform carbon offset from other sources of the carbon trading market (other carbon credit, such as green carbon or yellow carbon), thus achieving true economic and environmental optimization (for company or enterprise). The 14.2-GiM system mentioned above can refer to U.S. Pat. Pub. No. 2024/0095755 A1. That is, U.S. Pat. Pub. No. 2024/0095755 A1 is hereby incorporated by reference.

In FIG. 2, the carbon-negative emissions device 110 includes a carbon-negative device 200 and a processing device 300. The carbon-negative device 200 is configured to perform carbon-fixation according to a carbon-negative device parameter. The processing device 300 is signally connected to the carbon-negative device 200, and includes a memory and a processor. The memory stores a plurality of data sources, and the plurality of data sources include energy consumption information 102. The energy consumption information 102 comes from the carbon-negative device 200. The processor is signally connected to the memory and configured to perform the comprehensive energy-saving and carbon-negative method S0 (as shown in FIG. 3).

In addition, the carbon-negative device 200 of the comprehensive energy-saving and carbon-negative system 100 further includes a plurality of cyber physical agents (CPAs). The plurality of CPAs are connected between the processing device 300 and the carbon-negative device 200, and configured to collect the plurality of data sources. The plurality of data sources further include GiM information, and the GiM information (14.2-GiM information) comes from a factory.

In the embodiment, the processing device 300 may be a cloud platform that communicates with the plurality of CPAs and is configured to perform the comprehensive energy-saving and carbon-negative method S0. The cloud platform includes the intelligent services of Industry 4.1, so that the original various types of prediction results can be obtained before the process of Industry 4.2 is achieved; the intelligent services of Industry 4.1 include automatic virtual metrology (AVM), intelligent predictive maintenance (IPM), intelligent yield management (IYM) and intelligent dispatching system (IDS). The cloud platform further includes a secure cloud connector (Cloud REST API), intelligent CCUS planning and intelligent carbon trading planning. In addition, the memory and the processor of the processing device 300 may be a cloud memory (database) and a cloud processor, respectively. The above-mentioned cloud memory may include random access memory (RAM) or other types of dynamic storage devices that can store information and instructions for the cloud processor to perform. The information and instructions include greenhouse gas emission factors, activity data, product carbon emission, streaming information management, blockchain and file system. The cloud processor may include any type of processors, microprocessors, or field programmable gate arrays (FPGA) capable of compiling and performing instructions. The cloud processor may include a single device (e.g., single-core processor) or a group of devices (e.g., multiple-core processor), but the present disclosure is not limited thereto.

The plurality of CPAs of the present disclosure belong to Internet of Things (IoT) components and have security protection. Each of the plurality of CPAs includes: (1) utilizing vertical integration with the cloud service through communication module, sending information to the cloud server for storage or receiving instructions from the cloud service; (2) utilizing the equipment driver to integrate data with different sources, formats and processing methods horizontally, or transmit instructions to the equipment; (3) having pluggable application module, which can perform functions such as feature extraction and target data extraction; (4) having data collection plan to perform data collection whenever the status meets the conditions; (5) having kernel module to make each module operate smoothly and coordinate the operation of each module in CPAS; (6) utilizing containerization technology to have advanced software functions of load balance, failover, health inspection and computing resource allocation; and (7) having general-purpose information security protection mechanism (SPM) framework planning and including digital signatures and hardware key identification, which can ensure that the data uploaded to the cloud manufacturing service are safe and untampered. In another embodiment, the cyber physical agents (CPAs) mentioned above can refer to U.S. Pat. No.

10,618,137 B2. That is, U.S. Pat. No. 10,618,137 B2 is hereby incorporated by reference.

The carbon-negative emissions device 110 (CED) of the comprehensive energy-saving and carbon-negative system 100 (CESCN) of the present disclosure constructs a digital transformation environment required for CCUS in the CCUS environment, such as various sensors. The intelligent modules imported and deployed on the cloud platform (the processing device 300) may include: (a) intelligent CCUS planning module, and (b) intelligent carbon trading planning module. The intelligent modules may provide effective decision-making suggestions according to collected data and changes in the surrounding environment (such as sunlight intensity, temperature, pH, etc.). The specific solutions corresponding to the problems solved by the intelligent modules are shown as follows: (1) determining the implementation status of the CED and providing implementation plan of CCUS to maximize CCUS benefits and achieve carbon neutrality or even carbon-negative condition, thereby avoiding differences caused by personal experience and reducing human operating errors and manpower requirements simultaneously. (2) performing optimal control of CED parameter to automatically and dynamically change the operating parameters of each equipment and standardize the entire CCUS process of the CED, thereby simultaneously achieving the purpose of energy-saving and carbon-negative control on the premise of meeting the basic operating environment of CCUS and maximized CCUS benefits. (3) in order to quantify the results of CCUS, the present disclosure can calculate the carbon-fixation benefits which are brought about by absorbing a large amount of carbon dioxide during implementation of CCUS, and collect information on international carbon prices and the carbon trading market to facilitate analysis of the economic benefits brought about by the implementation of CCUS.

In FIG. 3, the comprehensive energy-saving and carbon-negative method S0 includes performing steps S01, S02, S03, S04, S041, S05, S06, S07, S071, and S08 (S01-S08). The operation details of each of the steps S01-S08 are described in detail below.

The step S01 can be regarded as a receiving step. The receiving step includes configuring a processor of a processing device 300 to receive a plurality of data sources from a memory. The plurality of data sources include energy consumption information 102 and the GiM information. The energy consumption information 102 comes from the carbon-negative device 200. The GiM information comes from the factory.

As seen from FIGS. 1, 2 and 3, the step S01 includes collecting key data required for the carbon-negative emissions device 110 via the CPAs. The key data includes energy consumption information of the carbon-negative emissions device 110. In addition, the step S01 may simultaneously monitor and record the carbon absorption of the CCUS production line, and obtain carbon emission information (14.2-GiM information) of other factories via the 14.2-GiM system, such as energy utilization, product production, transportation or direct and indirect emissions of greenhouse gases, e.g., carbon dioxide produced by other activities.

The step S02 includes configuring the intelligent CCUS planning module of the carbon-negative emissions device 110 to define a carbon emission reduction demand target value (i.e., a carbon absorption target value) according to the carbon emission reduction demand of the 14.2-GiM system, and calculate an expected production output and an estimated completion time.

The step S03 includes configuring the processor to perform a carbon-capture utilization storage process (CCUS process), and the CCUS process includes carbon capturing, utilizing and storing of carbon dioxide ($CO_2$).

The step S04 can be regarded as a process end confirming step, and the process end confirming step includes configuring the processor to confirm whether the CCUS process is completed according to the carbon emission reduction demand target value. In response to determining that the CCUS process is not completed, performing the steps S041 and S03. On the contrary, in response to determining that the CCUS process is completed, performing the step S05. In other words, if the amount of carbon dioxide captured by the CCUS process does not reached the carbon emission reduction demand target value defined in the step S02, performing the steps S041 and S03; otherwise, performing the step S05.

The step S041 includes configuring the processor to optimize the operating parameters of CCUS equipment to improve the execution efficiency of CCUS according to the data collected by the CPAs, such as energy consumption data of equipment or meteorological environment data. The setting of carbon-negative device parameter satisfies formula (1), which is to minimize growth cost (GC) of device electricity and carbon emission. In other words, the step S041 includes configuring the processor to perform a carbon-negative device parameter controlling step, and the carbon-negative device parameter controlling step includes utilizing an optimization algorithm to adjust the carbon-negative device parameter, and the carbon-negative device parameter is calculated as follows:

$$\min GC = w_{GC} GC^{ele} + (1 - w_{GC})\, GC^{ce}; \tag{1}$$

where min GC represents a minimum growth control cost; $w_{GC}$ represents a growth control weight; $GC^{ele}$ represents a device electricity cost; and $GC^{ce}$ represents a device carbon emission cost. In the embodiment, the optimization algorithm may be a genetic algorithm, but the present disclosure is not limited thereto.

An intelligent carbon-capture utilization storage planning step SA of the present disclosure includes the steps S02, S03 and S041. An intelligent carbon trading planning step SB includes the steps S05, S06, S07 and S071. The step S04 may confirm whether the CCUS process is completed to generate a result, and then performing the intelligent carbon-capture utilization storage planning step SA or the intelligent carbon trading planning step SB according to the result. In response to determining that the CCUS process is not completed, the processor is configured to repeatedly perform the intelligent carbon-capture utilization storage planning step SA. On the contrary, in response to determining that the CCUS process is completed, the processor is configured to perform the intelligent carbon trading planning step SB.

The step S05 includes configuring the processor to calculate an actual carbon emission reduction amount according to an amount of the carbon dioxide absorbed in the CCUS process. In other words, the intelligent carbon trading planning module of the carbon-negative emissions device 110 accurately calculates the actual carbon emission reduction amount according to the amount of the carbon dioxide absorbed in the CCUS process.

The step S06 includes configuring the processor to implement the voluntary carbon emission reduction of the 14.2-GiM system according to the actual carbon emission reduction amount of the step S05.

The step S07 includes configuring the processor to confirm whether the carbon emission reduction demand of the 14.2-GiM system is met. In detail, the step S07 includes configuring the processor to confirm whether a carbon offset demand of the 14.2-GiM system is met to generate a confirmation result. In response to determining that the confirmation result is yes, performing the step S08; in response to determining that the confirmation result is no, performing the steps S071 and S06.

The step S071 includes configuring purchasing carbon emission reduction credit from the carbon trading market. Then, the step S06 is performed for carbon offset.

The step S08 includes performing a transaction profit and loss analysis, that is, performing an economic benefit analysis for the implementation of the CCUS process.

Figure 4:
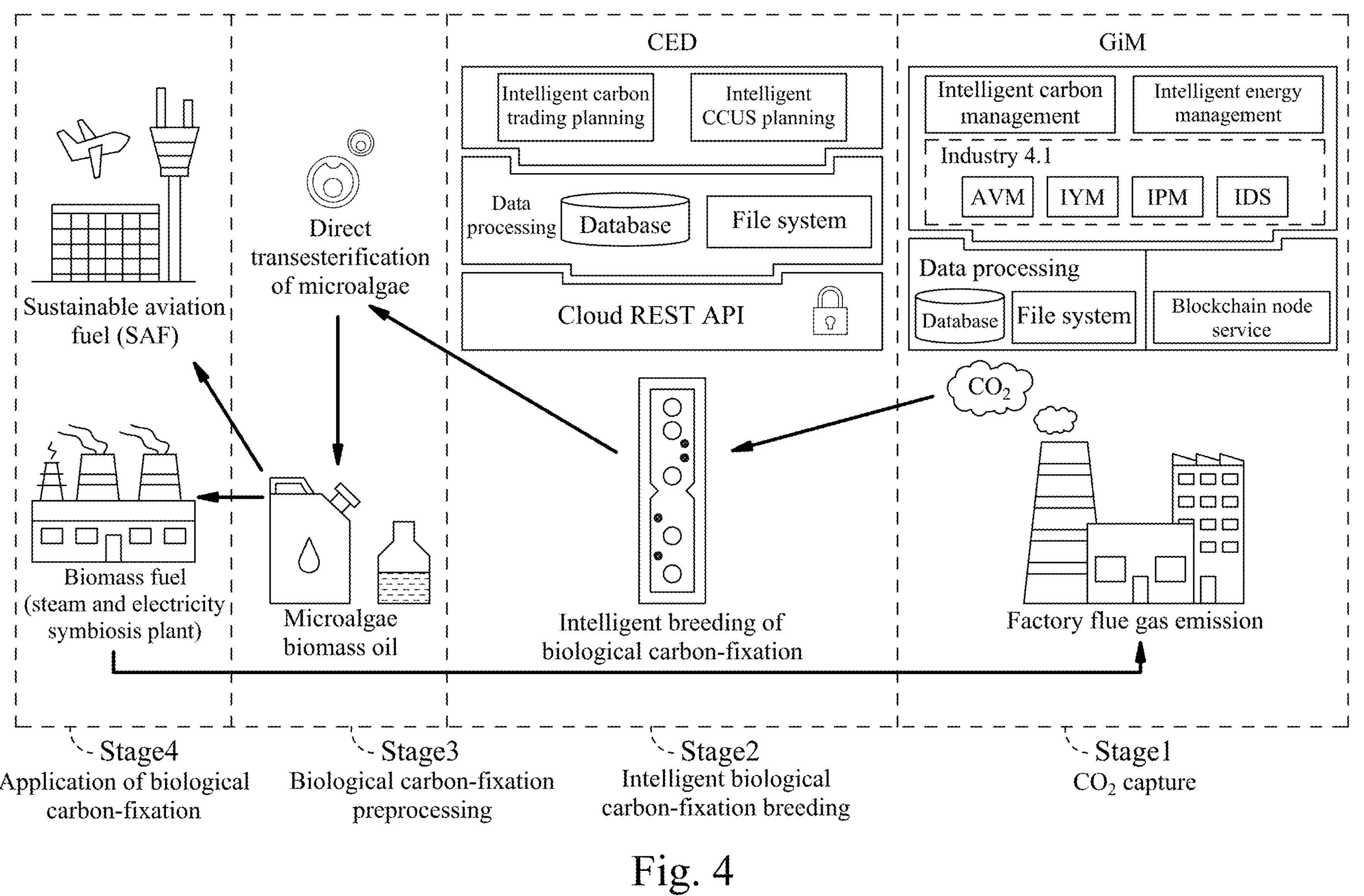
FIG. 4 shows a schematic view of a practical application of microalgae of the comprehensive energy-saving and carbon-negative system of FIG. 1.

Reference is made to FIGS. 1, 2, 3 and 4. FIG. 4 shows a schematic view of a practical application of microalgae of the comprehensive energy-saving and carbon-negative system 100 of FIG. 1. The practical application of microalgae can include four stages Stage1, Stage2, Stage3 and Stage4. The stage Stage1 includes the 14.2-GiM system. The factories emit flue gas containing the large amount of carbon dioxide into the atmosphere. The 14.2-GiM system can be used to save energy and reduce carbon emissions. The stage Stage2 includes the carbon-negative emissions device 110. Although the 14.2-GiM system can be used to save energy and reduce carbon emissions in the stage Stage1, the 14.2-GiM system has a processing limit. If the carbon emissions of the factories exceed the processing limit of the 14.2-GiM system, the carbon-negative emissions device 110 (CED) can be used to absorb the excess carbon emissions via CCUS technology (e.g., microalgae breeding of biological carbon-fixation). The stage Stage3 includes direct transesterification of microalgae and microalgae biomass oil. After breeding of microalgae, biomass oil is extracted from the microalgae. The stage Stage4 includes specific applications. There are two specific applications after capturing carbon dioxide by the CCUS process. The first application is biomass fuel (steam and electricity symbiosis plant), which can use microalgae biomass oil as one of the fuels of the steam and electricity symbiosis plant. The second application is sustainable aviation fuel (SAF), which can use microalgae biomass oil as a biomass fuel source of sustainable aviation fuel (SAF).

It can be understood that the comprehensive energy-saving and carbon-negative method S0 of the present disclosure is the above-mentioned implementation steps, and the computer program product of the present disclosure is used to perform the comprehensive energy-saving and carbon-negative method S0. Each of the steps of the comprehensive energy-saving and carbon-negative method S0 corresponds to each of the operations of the comprehensive energy-saving and carbon-negative system 100. The order of each implementation step described in the above embodiments can be adjusted, combined or omitted as needed. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in the carbon-negative emissions device 110, the present disclosure is not limited to implementation in the carbon-negative emissions device 110 and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws and papermaking. The manufacturing system includes one or more processing tools that may be used to form one or more products, or portions thereof, in or on the workpieces (such as wafers, glass substrates and paper). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

According to the aforementioned embodiments and examples, the advantages of the present disclosure are described as follows.

1. The present disclosure can determine the implementation status of the CED and provide implementation plan of CCUS to maximize CCUS benefits and achieve carbon neutrality or even carbon-negative condition, thereby avoiding differences caused by personal experience and reducing human operating errors and manpower requirements simultaneously.
2. The present disclosure can perform optimal control of CED parameter to automatically and dynamically change the operating parameters of each equipment and standardize the entire CCUS process of the CED, thereby simultaneously achieving the purpose of energy-saving and carbon-negative control on the premise of meeting the basic operating environment of CCUS and maximized CCUS benefits.
3. In order to quantify the results of CCUS, the present disclosure can calculate the carbon-fixation benefits which are brought about by absorbing the large amount of carbon dioxide during implementation of CCUS, and collect information on international carbon prices and the carbon trading market to facilitate analysis of the economic benefits brought about by the implementation of CCUS.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A comprehensive energy-saving and carbon-negative system, comprising:

a carbon-negative device configured to perform carbon-fixation according to a carbon-negative device parameter; and a processing device signally connected to the carbon-negative device, and comprising:

a memory storing a plurality of data sources, wherein the plurality of data sources comprise energy consumption information, and the energy consumption information comes from the carbon-negative device; and a processor signally connected to the memory and configured to perform operations comprising:

performing an intelligent carbon-capture utilization storage planning operation, wherein the intelligent carbon-capture utilization storage planning operation comprises defining a carbon emission reduction demand target value according to a carbon emission reduction demand of a green intelligent manufacturing (GiM) system, and calculating an expected production output and an estimated completion time, and performing a carbon-capture utilization storage process, and the carbon-capture utilization storage process comprises carbon capturing, utilizing and storing of carbon dioxide;

performing a process end confirming operation, wherein the process end confirming operation comprises confirming whether the carbon-capture utilization storage process is completed according to the carbon emission reduction demand target value; and performing an intelligent carbon trading planning operation, wherein the intelligent carbon trading planning operation comprises calculating an actual carbon emission reduction amount according to an amount of the carbon dioxide absorbed in the carbon-capture utilization storage process to perform voluntary carbon emission reduction of the GiM system, and confirming whether the carbon emission reduction demand of the GiM system is met;

wherein the carbon-capture utilization storage process is used in one of a biomass fuel application and a sustainable aviation fuel application;

wherein the intelligent carbon-capture utilization storage planning operation, the process end confirming operation and the intelligent carbon trading planning operation are performed in sequence.

2. The comprehensive energy-saving and carbon-negative system of claim 1, wherein the processor is configured to perform the operations further comprising:

in response to determining that the carbon-capture utilization storage process is not completed, repeatedly performing the intelligent carbon-capture utilization storage planning operation; and in response to determining that the carbon-capture utilization storage process is completed, performing the intelligent carbon trading planning operation.

3. The comprehensive energy-saving and carbon-negative system of claim 1, further comprising:

a plurality of cyber physical agents (CPAs) connected between the processing device and the carbon-negative device, and configured to collect the plurality of data sources;

wherein the plurality of data sources further comprise GiM information, and the GiM information comes from a factory.

4. The comprehensive energy-saving and carbon-negative system of claim 1, wherein the intelligent carbon-capture utilization storage planning operation further comprises:

performing a carbon-negative device parameter controlling operation, wherein the carbon-negative device parameter controlling operation comprises utilizing an optimization algorithm to adjust the carbon-negative device parameter, and the carbon-negative device parameter is calculated as follows:

$$\min GC = w_{GC} GC^{ele} + (1 - w_{GC})\, GC^{ce};$$

wherein min GC represents a minimum growth control cost; $W_{GC}$ represents a growth control weight; $GC^{ele}$ represents a device electricity cost; and $GC^{ce}$ represents a device carbon emission cost.

5. The comprehensive energy-saving and carbon-negative system of claim 4, wherein the optimization algorithm is a genetic algorithm.

6. The comprehensive energy-saving and carbon-negative system of claim 1, wherein the intelligent carbon trading planning operation further comprises:

confirming whether a carbon offset demand of the GiM system is met to generate a confirmation result;

wherein in response to determining that the confirmation result is yes, performing a transaction profit and loss analysis;

wherein in response to determining that the confirmation result is no, performing the voluntary carbon emission reduction of the GiM system.

7. A comprehensive energy-saving and carbon-negative method, comprising:

performing a receiving step, wherein the receiving step comprises configuring a processor of a processing device to receive a plurality of data sources from a memory, wherein the plurality of data sources comprise energy consumption information, the energy consumption information comes from a carbon-negative device, and the carbon-negative device is configured to perform carbon-fixation according to a carbon-negative device parameter;

performing an intelligent carbon-capture utilization storage planning step, wherein the intelligent carbon-capture utilization storage planning step comprises configuring the processor to define a carbon emission reduction demand target value according to a carbon emission reduction demand of a green intelligent manufacturing (GiM) system, and calculate an expected production output and an estimated completion time, and perform a carbon-capture utilization storage process, and the carbon-capture utilization storage process comprises carbon capturing, utilizing and storing of carbon dioxide;

performing a process end confirming step, wherein the process end confirming step comprises configuring the processor to confirm whether the carbon-capture utilization storage process is completed according to the carbon emission reduction demand target value; and performing an intelligent carbon trading planning step, wherein the intelligent carbon trading planning step comprises configuring the processor to calculate an actual carbon emission reduction amount according to an amount of the carbon dioxide absorbed in the carbon-capture utilization storage process to perform voluntary carbon emission reduction of the GiM system, and confirm whether the carbon emission reduction demand of the GiM system is met;

wherein the carbon-capture utilization storage process is used in one of a biomass fuel application and a sustainable aviation fuel application;

wherein the intelligent carbon-capture utilization storage planning step, the process end confirming step and the intelligent carbon trading planning step are performed in sequence.

8. The comprehensive energy-saving and carbon-negative method of claim 7, further comprising:

in response to determining that the carbon-capture utilization storage process is not completed, configuring the processor to repeatedly perform the intelligent carbon-capture utilization storage planning step; and in response to determining that the carbon-capture utilization storage process is completed, configuring the processor to perform the intelligent carbon trading planning step.

9. The comprehensive energy-saving and carbon-negative method of claim 7, further comprising:

configuring a plurality of cyber physical agents (CPAs) to collect the plurality of data sources, wherein the plurality of cyber physical agents are connected between the processing device and the carbon-negative device;

wherein the plurality of data sources further comprise GiM information, and the GiM information comes from a factory.

10. The comprehensive energy-saving and carbon-negative method of claim 7, wherein the intelligent carbon-capture utilization storage planning step further comprises:

configuring the processor to perform a carbon-negative device parameter controlling step, wherein the carbon-negative device parameter controlling step comprises utilizing an optimization algorithm to adjust the carbon-negative device parameter, and the carbon-negative device parameter is calculated as follows:

$$\min GC = w_{GC} GC^{ele} + (1 - w_{GC}) GC^{ce};$$

wherein min GC represents a minimum growth control cost; $W_{GC}$ represents a growth control weight; $GC^{ele}$ represents a device electricity cost; and $GC^{ce}$ represents a device carbon emission cost.

11. The comprehensive energy-saving and carbon-negative method of claim 10, wherein the optimization algorithm is a genetic algorithm.

12. The comprehensive energy-saving and carbon-negative method of claim 7, wherein the intelligent carbon trading planning step further comprises:

configuring the processor to confirm whether a carbon offset demand of the GiM system is met to generate a confirmation result;

wherein in response to determining that the confirmation result is yes, performing a transaction profit and loss analysis;

wherein in response to determining that the confirmation result is no, performing the voluntary carbon emission reduction of the GiM system.

13. A non-transitory computer readable recording medium storing instructions which when executed by a processor of a processing device configured to perform a comprehensive energy-saving and carbon-negative method, the comprehensive energy-saving and carbon-negative method comprising:

performing a receiving step, wherein the receiving step comprises configuring the processor to receive a plurality of data sources from a memory, wherein the plurality of data sources comprise energy consumption information, the energy consumption information comes from a carbon-negative device, and the carbon-negative device is configured to perform carbon-fixation according to a carbon-negative device parameter;

performing an intelligent carbon-capture utilization storage planning step, wherein the intelligent carbon-capture utilization storage planning step comprises configuring the processor to define a carbon emission reduction demand target value according to a carbon emission reduction demand of a green intelligent manufacturing (GiM) system, and calculate an expected production output and an estimated completion time, and perform a carbon-capture utilization storage process, and the carbon-capture utilization storage process comprises carbon capturing, utilizing and storing of carbon dioxide;

performing a process end confirming step, wherein the process end confirming step comprises configuring the processor to confirm whether the carbon-capture utilization storage process is completed according to the carbon emission reduction demand target value; and performing an intelligent carbon trading planning step, wherein the intelligent carbon trading planning step comprises configuring the processor to calculate an actual carbon emission reduction amount according to an amount of the carbon dioxide absorbed in the carbon-capture utilization storage process to perform voluntary carbon emission reduction of the GiM system, and confirm whether the carbon emission reduction demand of the GiM system is met;

wherein the carbon-capture utilization storage process is used in one of a biomass fuel application and a sustainable aviation fuel application;

wherein the intelligent carbon-capture utilization storage planning step, the process end confirming step and the intelligent carbon trading planning step are performed in sequence.

14. The non-transitory computer readable recording medium of claim 13, wherein the comprehensive energy-saving and carbon-negative method further comprises:

in response to determining that the carbon-capture utilization storage process is not completed, configuring the processor to repeatedly perform the intelligent carbon-capture utilization storage planning step; and in response to determining that the carbon-capture utilization storage process is completed, configuring the processor to perform the intelligent carbon trading planning step.

15. The non-transitory computer readable recording medium of claim 13, wherein the comprehensive energy-saving and carbon-negative method further comprises:

configuring a plurality of cyber physical agents (CPAs) to collect the plurality of data sources, wherein the plurality of cyber physical agents are connected between the processing device and the carbon-negative device;

wherein the plurality of data sources further comprise GiM information, and the GiM information comes from a factory.

16. The non-transitory computer readable recording medium of claim 13, wherein the intelligent carbon-capture utilization storage planning step further comprises:

configuring the processor to perform a carbon-negative device parameter controlling step, wherein the carbon-negative device parameter controlling step comprises utilizing an optimization algorithm to adjust the carbon-negative device parameter, and the carbon-negative device parameter is calculated as follows:

$$\min GC = w_{GC} GC^{ele} + (1 - w_{GC})\, GC^{ce};$$

wherein min GC represents a minimum growth control cost; $W_{GC}$ represents a growth control weight; $GC^{ele}$ represents a device electricity cost; and $GC^{ce}$ represents a device carbon emission cost.

17. The non-transitory computer readable recording medium of claim 16, wherein the optimization algorithm is a genetic algorithm.

18. The non-transitory computer readable recording medium of claim 13, wherein the intelligent carbon trading planning step further comprises:

configuring the processor to confirm whether a carbon offset demand of the GiM system is met to generate a confirmation result;

wherein in response to determining that the confirmation result is yes, performing a transaction profit and loss analysis;

wherein in response to determining that the confirmation result is no, performing the voluntary carbon emission reduction of the GiM system.

* * * * *